United States Patent [19]

Heuft

[11] 4,321,994
[45] Mar. 30, 1982

[54] MEANS FOR LATERALLY DEFLECTING ARTICLES FROM A PATH OF TRAVEL

[76] Inventor: Bernhard Heuft, Im Sonnenwinkel 14, 5475 Burgbrohl, Fed. Rep. of Germany

[21] Appl. No.: 141,847

[22] Filed: Apr. 21, 1980

[30] Foreign Application Priority Data

Apr. 27, 1979 [DE] Fed. Rep. of Germany ....... 2917286

[51] Int. Cl.$^3$ ............................................. B65G 37/00
[52] U.S. Cl. .................................. 198/436; 198/367; 198/438; 209/653
[58] Field of Search ............... 198/367, 436, 442, 640, 198/636, 438, 493; 209/653, 651, 644

[56] References Cited

U.S. PATENT DOCUMENTS

| | | | |
|---|---|---|---|
| 2,841,269 | 7/1958 | Jenney et al. ........................ | 198/428 |
| 2,991,893 | 7/1961 | Kirsch et al. ........................ | 198/438 |
| 3,138,408 | 6/1964 | Bruce et al. ......................... | 198/493 |
| 3,791,518 | 2/1974 | Vanderhoof ......................... | 198/461 |
| 4,142,636 | 3/1979 | Planke ................................. | 198/367 |

FOREIGN PATENT DOCUMENTS

| | | | |
|---|---|---|---|
| 985213 | 3/1976 | Canada ................................ | 209/653 |
| 1071587 | 12/1959 | Fed. Rep. of Germany ...... | 198/367 |

*Primary Examiner*—Robert B. Reeves
*Assistant Examiner*—Brian Bond

[57] ABSTRACT

An apparatus for laterally deflecting selected articles from a first conveyor to one or more other conveyors comprises either extensible and retractable deflective segments, or gas nozzles whose intensity is adjustable. The deflective segments have tapered front faces which jointly form a smooth deflecting face whose taper increases in the direction of conveyance. The number of segments used depends on the speed component required, and the segments are extended by only a portion of the lateral distance the articles are to cover, the remainder of the distance being covered by the imparted inertia.

Alternative embodiments include a deflecting wedge or flap.

5 Claims, 6 Drawing Figures

FIG. 1

MEANS FOR LATERALLY DEFLECTING ARTICLES FROM A PATH OF TRAVEL

SUMMARY OF THE INVENTION

The present invention relates to an apparatus for laterally deflecting articles from a first path of travel to a second path of travel.

BACKGROUND OF THE INVENTION

In U.S. Patent Application Ser. No. 2261, filed Jan. 10, 1979, and partly corresponding European Patent Application Ser. No. 79 100 027, a deflecting apparatus has been proposed in which a plurality of deflecting means form a deflecting face along which articles selected according to a specific criterion are deflected from a first path of travel to a second path of travel. The deflecting means build up only a part of the entire deflecting surface at a time, namely, the part which, immediately thereafter, contacts the article to be deflected. The deflecting surface spans the entire width of the first path of travel or conveyor. Once selected articles have been deflected by the first part of the deflecting face or by the first deflecting means to such an extent that they can be pushed onto the second conveyor by successive articles, the last part of the deflecting face or the last deflecting means can remain inoperative. In lieu of extensible deflecting segments, the deflecting means may consist of gas nozzles of which only those are set in operation which confront articles being deflected at any given time. In this known deflecting apparatus, the operating speed, and thus the maximum admissible speed of the first conveyor, is limited by the period of time required for extension and retraction of the deflecting segments or by the intensity of the gas nozzles. Moreover, when gas nozzles are employed as deflecting means, the intensity of the gas jet must be controlled in relation to the weight of the articles.

Consequently, it is an object of the invention to provide an apparatus for lateral deflection of articles selected according to a specific criterion from a first path of travel to a second path of travel at an especially high operating speed and an especially high article conveying speed.

This object is realized by imparting to the articles being deflected a velocity component which is directed transversely of the direction of travel of the first path of travel. This velocity component is imparted by a deflecting means whose deflecting face extends over only part of the width of the first path of travel. This velocity component can be imparted also by gas nozzles. The velocity component must be sufficiently high in order that the article completely moves over to the second path of travel or conveyor during the last phase of the deflection, owing to its inertia.

The advantages achievable by the invention reside especially in the fact that, the higher the deflecting speed, the less does the deflecting face formed by the deflecting means extend transversely across the first conveyor. It is surprising that even at high speeds a well defined transverse acceleration can be imparted to unstable articles of various weights and with various centers of gravity without overturning them. Hence, after said articles have left the diverting apparatus, their stability is dependent only on the sliding characteristics of the conveyors. Owing to the short actuating periods a higher operating speed and greater safety is achieved than with deflecting apparatuses where the articles are guided by a deflecting face during the entire deflecting operation.

BRIEF INTRODUCTION TO THE DRAWINGS

In order that the invention may be more clearly understood, reference will now be made to the accompanying drawings wherein several embodiments are shown for purposes of illustration, and wherein.

DESCRIPTION OF PREFERRED EMBODIMENT

The deflecting apparatuses shown in the drawings comprise a first conveyor 12 and one or more second conveyor(s) 14 to deflect or convey articles 10, e.g., bottles, boxes or other articles, from said first conveyor 12 to the second conveyor 14 or to one of the second conveyors 14 by means of segments 18$n$ (n standing for a, b, c . . . ) or gas nozzles 70$n$. The articles to be deflected are selected by a discriminating means (not shown) in order to weed out bottles which are, e.g., incompletely filled or improperly closed. In order to prevent the articles from falling off the conveyors, railings 15, 16, 17 may be provided.

Figure 1:
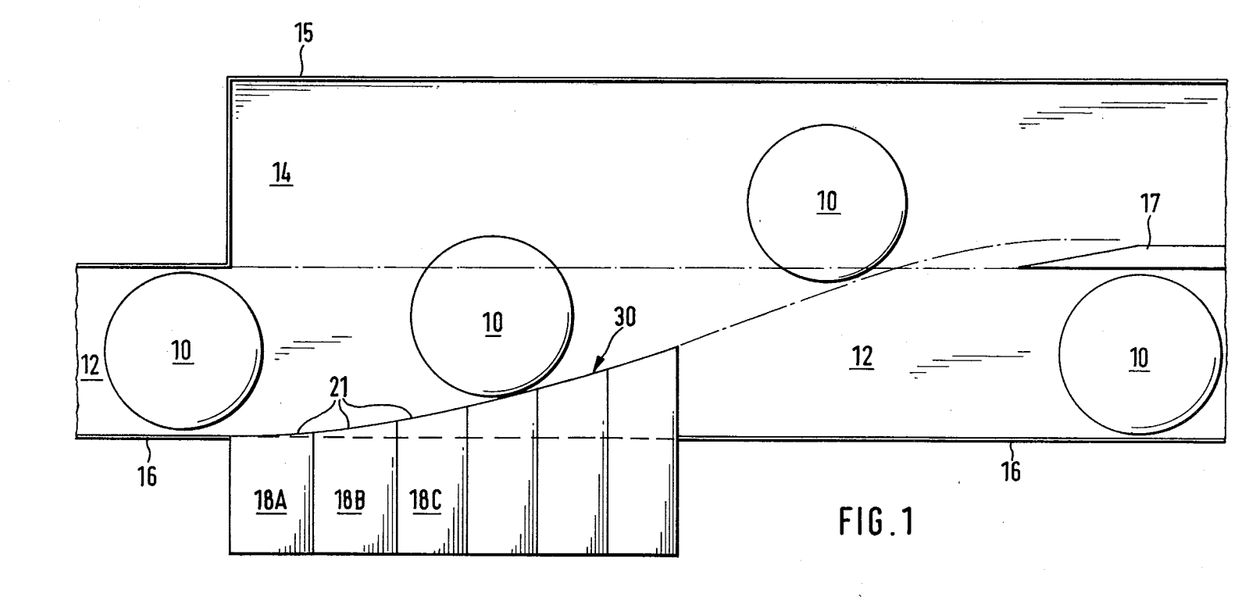
FIG. 1 is a plan view of a deflecting apparatus with a plurality of deflecting means in the form of segments.

In the embodiment shown in FIG. 1 the deflecting means exclusively consist of extensible deflecting segments 18$n$. The front faces of the deflecting segments 18$n$ are tapered to form, when extended, a smooth deflecting face 30. Preferably the taper of said front faces increases in the direction of conveyance. Ideally, the taper of the front faces increases so as to give the deflecting face 30 a parabolically curved configuration. Such a parabolically curved deflecting face 30 increases by an equal amount the velocity component of an article being deflected transversely of the direction of travel by each deflecting segment 18$n$; i.e., an article being deflected is uniformly accelerated toward the second conveyor 14 by the segments 18$a$. When leaving the last extended deflecting segment designated 18$e$ (in FIG. 1), the velocity component of the article transversely of the direction of advance approximately corresponds to the speed of conveyance of the first conveyor x sin $\alpha$, $\alpha$ being the angle of taper of the front face of the last deflecting segment. This shows that the speed component transversely of the direction of advance is proportional to the speed of travel or conveyance. Said speed component must be sufficiently high to assure that an article being deflected will reach the second conveyor 14 owing to its inertia. Thus, since the articles can move over part of the way from the first conveyor 12 to the second conveyor 14 without being guided due to their inertia, the articles need not be guided by deflecting face 30 all the way to the second conveyor 14; it is sufficient for them to be guided by deflecting face 30 only during the first half of their travel from the first conveyor 12 to the second conveyor 14, for instance, and to accelerate them in transverse direction to such a degree that they move along the second half of said travel as a result of the velocity component imparted to them transversely of the direction of conveyance. During the second half of their travel, this velocity component is slowed by friction between the bottom face of the articles and the covering of the conveyors.

The higher the speed of conveyance the smaller may be the angle $\alpha$ of taper of the last deflecting segment, i.e., the less deflecting segments are required to reach a given velocity component transversely of the direction of conveyance. At very high speeds it may therefore be sufficient to guide the articles by the deflecting face 30 only along the first third of their travel from the first conveyor to the second conveyor, so that they move freely over the last two-thirds of such travel. On the other hand, at relatively low speeds of conveyance it may be necessary to make the deflecting face 30 sufficiently long to guide the articles along two-thirds or even three-quarters of their travel.

The width of the deflecting segments 18n may be less than the dimension of the articles in the direction of conveyance, e.g., the diameter of bottles. Preferably said width is one-half or one-third of the dimension of the articles in the direction of conveyance. The length of the deflecting face 30, i.e., the distance between the beginning of the first deflecting segment and the end of the last deflecting segment, may be greater than the dimension of the article in the direction of conveyance, while still permitting the articles to be individually deflected, even if they arrive in close succession. This result is achieved in that, rather than being extended and retracted all at the same time, only those deflecting segments are extended at any given time which are actually needed at that moment or directly thereafter for deflecting the article, i.e., only those segments which are in contact with the article. Suitable control systems comprising two light barriers for each segment giving the "retract" command or the "extend" command for the respective segment, or a single light barrier at the point of first contact with the deflecting face 30, the time of extension and retraction of each deflecting segment being computed from its distance from the light barrier and from the speed of conveyance, are described in the above-mentioned U.S. and European applications. These patent applications also describe in detail the construction and the extension mechanism of the segments.

Figure 2:
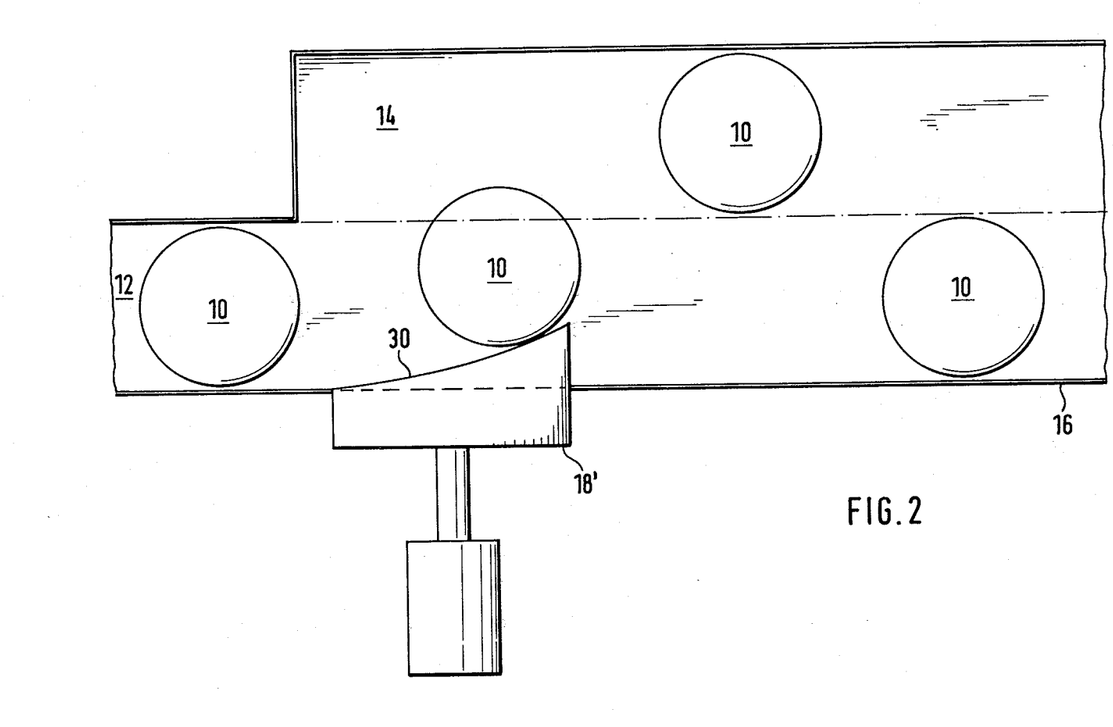
FIG. 2 is a plan view of a deflecting apparatus with pop-up wedge, i.e., with a single deflecting segment of greater width.
Figure 3:
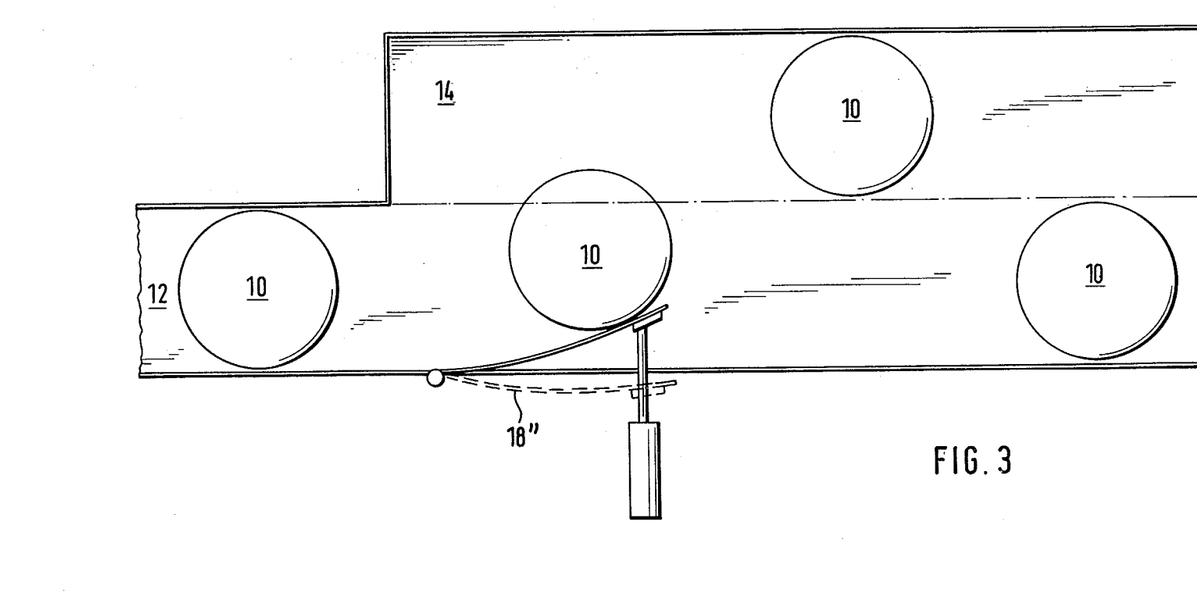
FIG. 3 is a plan view of a deflecting apparatus with a movable deflecting flap as deflecting means.

In conveyor arrays for bottles holding beverages as used, for example, in beverage filling systems and bottle cleaning systems, the present invention can be employed at speeds of conveyance upwards of about 0.8 m/sec, a suitable speed of conveyance being, for example, 1.5 m/sec. If the speed of conveyance is too slow, it is possible to move the articles to a conveyor travelling at a sufficiently high speed. The space between the articles then widens accordingly, and a certain minimum space is maintained between the articles at all times. In such a case, a deflecting apparatus as shown in FIG. 2 can be employed, where the deflecting face 30 is formed by a single deflecting wedge 18'. The space between the articles must be wider than the sum of the length of the deflecting wedge plus the product of speed of conveyance and actuating period of the deflecting wedge. The deflecting wedge 18' is extended in sufficient time so that it is already fully extended before colliding with an article 10 to be deflected. In lieu of a deflecting wedge 18', a deflecting flap 18" may be used, as shown in FIG. 3. The deflecting flap 18" is secured at its trailing end (in the direction of movement of conveyor 12) and is rotated by a pneumatic cylinder engaging it at a point remote from said end. The pneumatic cylinder is controlled by a detecting means, e.g., a light barrier. The deflecting wedge 18' and the deflecting flap 18" are retracted as soon as either an article being deflected has left the deflecting wedge or the deflecting flap, or before an article that is not to be deflected approaches the deflecting wedge or the deflecting flap. It is essential in this embodiment, too, that the thickness of the wedge or the amount by which the deflecting flap is extended corresponds to only a fraction of the required total deflection. For deflecting a 0.25 l Vichy bottle by 70 mm at a speed of conveyance of 1.5 m/sec., for example, a deflecting wedge 18' having a length of about 30 to 40 mm and a thickness or extended width of 20 to 25 mm is sufficient. Surprisingly, the unstable bottle does not topple over regardless of its filling level, even if the second conveyor 14 travels at only half the speed of the first conveyor 12.

In the preceding description it has been assumed that the first conveyor travels at constant speed. If the amount of extension of the deflecting flap 18" is made variable, the same velocity component transversely of the direction of conveyance may be imparted to the articles 10 also at variable speed of the first conveyor. Rather than being secured at its trailing end, the deflecting flap 18" will be designed, in this variant, as a spring band with its tip merging smoothly into railing 16. Depending on how far the deflecting flap 18" is extended, the end thereof then forms a different angle $\alpha$ with the first conveyor. A change in the amount of extension is achievable, for example, by providing the piston rod of the pneumatic cylinder with a stop cooperating with a counter-stop shiftable by an actuator. The actuator is driven in response to the speed of conveyance such that at decreasing speed the amount of extension is increased. In addition, the control of the pneumatic cylinder must be varied such that the greater length and the longer period of extension and the lesser speed of conveyance are compensated and the deflecting flap 18" is extended directly ahead of an article to be deflected and is retracted behind said article or in good time before the arrival of the next article that is not to be deflected.

In the deflecting apparatus shown in FIG. 1, the adaptation to varying speeds of the first conveyor is effected by varying the number of deflecting segments employed, i.e., at very low speeds of conveyance all the deflecting segments are used, while at very high speeds of conveyance a sufficient velocity component transversely of the conveyor is attained already by use of only three out of the six deflecting segments, for example, so that the last three deflecting segments need not be extended. Thus, for example, in a deflecting apparatus comprising nine segments, the control may be such that, at a speed of conveyance of more than 70 cm/sec., the ninth segment is not extended, that at a speed of more than 85 cm/sec. the eighth and ninth segment are not extended, etc., until at a speed of conveyance of about 1.5 m/sec. only the first three segments are extended. The foregoing example assumes a segment width of about 2 cm. Reducing the number of segments at higher speeds of conveyance offers the advantage that, at high speeds of conveyance, particularly the last segments with the longest paths of extension and the longest extension periods may remain inoperative, so that no upper limit to the operating speed of the deflecting apparatus is dictated by the segment operating periods.

Figure 5:
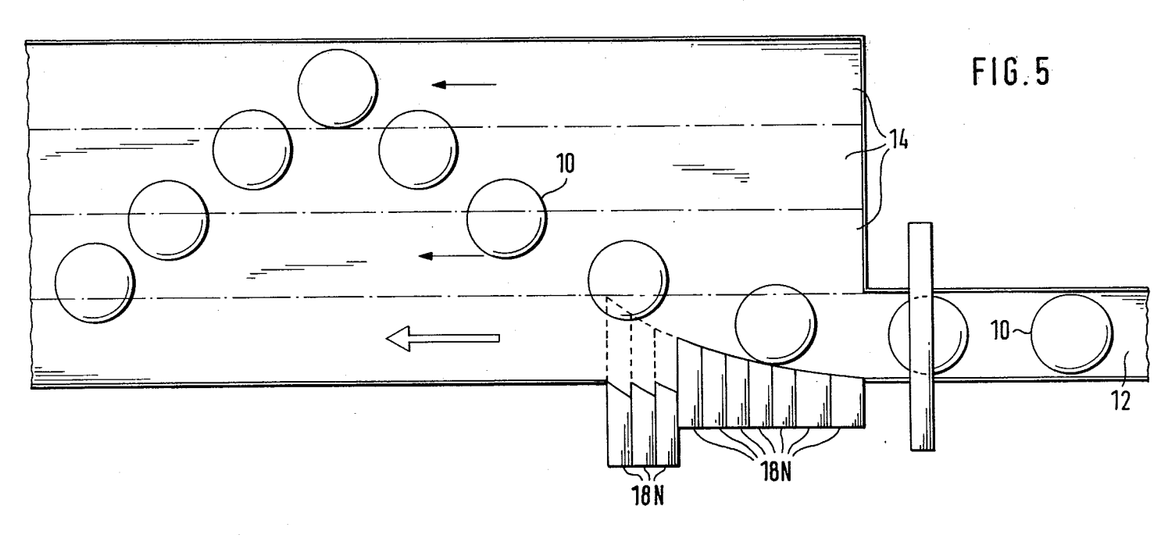
FIG. 5 shows a deflecting apparatus in which the articles either remain on the first conveyor or are distributed onto a plurality of second conveyors.
Figure 6:
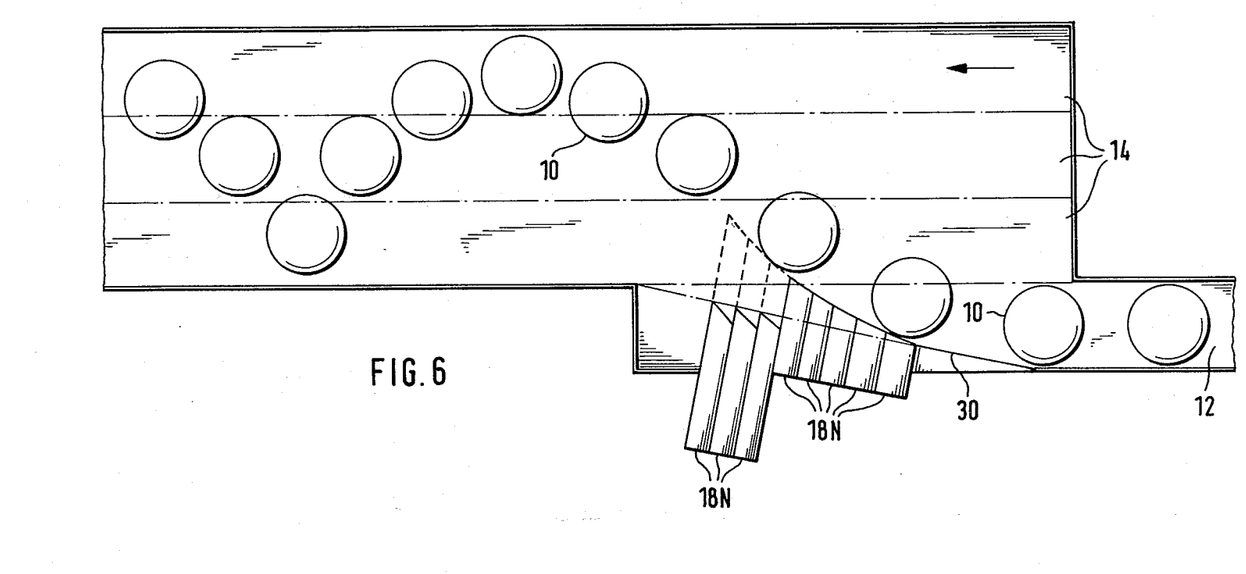
FIG. 6 is a plan view of a deflecting apparatus in which the articles are distributed in any event onto one of a plurality of second conveyors.

With a deflecting apparatus as shown in FIGS. 5 and 6 of the above mentioned patent applications, i.e., with deflecting apparatuses where the segments are rotated about an axis rather than being extended rectilinearly, the path of extension, i.e., the angle of rotation of the segments, may be adapted to the speed of conveyance by a stop bar shiftable by way of an actuator, the angle of roatation decreasing with increasing speed of conveyance. Suitably, the first segment is designed as a spring band whose tip is fixedly connected to the railing so as to provide a smooth transition to the deflecting plane. Here, too, the operating segment periods become shorter at higher speeds of conveyance.

Figure 4:
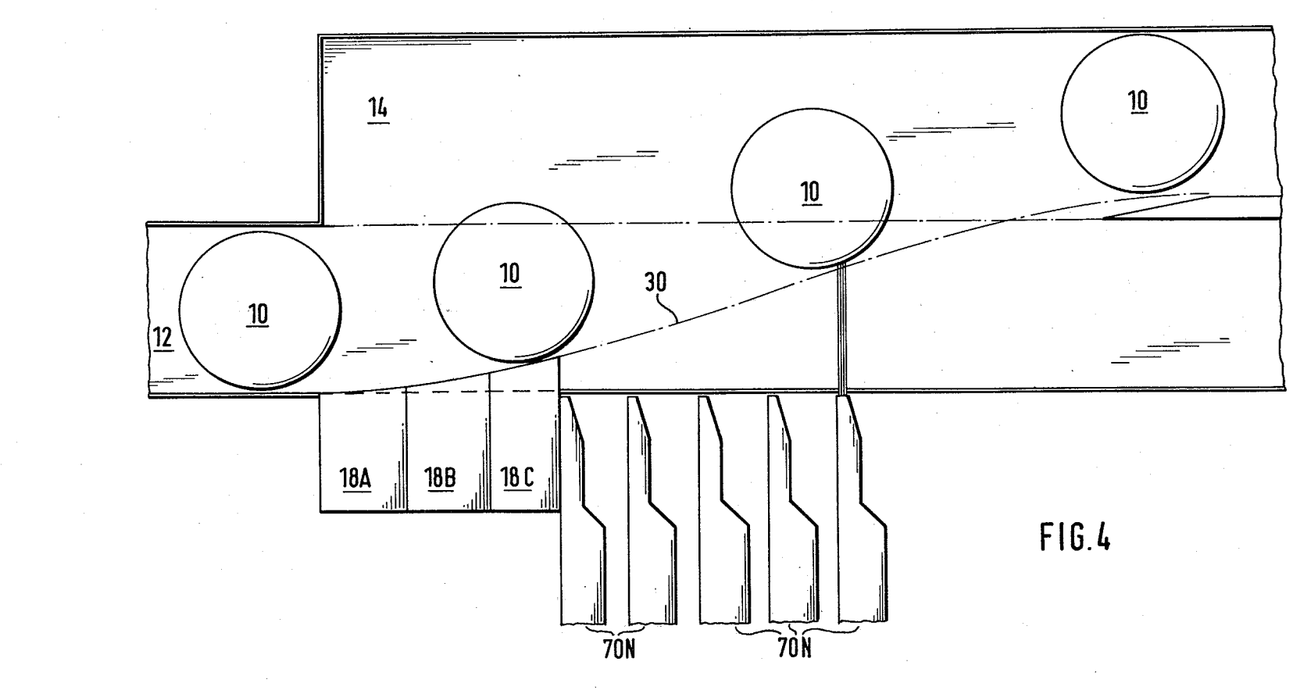
FIG. 4 is a plan view of a deflecting apparatus in which the first three deflecting means are extensible segments, while the last five deflecting means are gas nozzles.

A further subject matter of the present application is a deflecting apparatus of the type described in the two aforementioned patent applications where part of the deflecting means comprises shiftable or rotatable segments, while the remaining deflecting means comprise air nozzles. Such a deflecting apparatus is shown in FIG. 4. The extensible or rotatable segments $18n$ form the first deflecting means, while gas nozzles $70n$ form the last deflecting means. This offers the advantage that the consumption of pressurized gas and power is substantially less than that of a deflecting apparatus in which all the deflecting means consist of gas nozzles, since the static friction of the articles against the first conveyor is overcome by extensible segments $18n$ rather than by gas jets. Gas nozzles $70n$ need to compensate only for the sliding friction of the articles 10 against the first or second conveyor. With very narrow spacing between the articles and at very high speeds of conveyance, preferably 2 to 4 deflecting segments are used to overcome the static friction, and are then succeeded by a plurality of gas nozzles $70n$. In lieu of gas nozzles $70n$, suction nozzles as described in the two aforementioned patent applications may be employed.

For deflecting apparatuses operating with gas nozzles, a further embodiment comprises a relatively small deflecting wedge fixedly mounted upstream of the gas nozzles to impart to all the articles a minor velocity component transversely of the direction of conveyance. The articles to be deflected are then further deflected by the succeeding gas nozzles, while the articles not to be deflected but to remain on the first conveyor are carried along on the first conveyor in slightly offset position, and are not contacted by the gas jets.

FIGS. 5 and 6 show embodiments comprising a plurality of second conveyors 14. The deflecting apparatus 11 imparts to the articles 10 different velocity components transversely of the direction of conveyance. If all the deflecting segments $18n$ are used to deflect a specific article 10, a very high velocity component is imparted to said article, i.e., it is deflected to a second conveyor 14 located at relatively great distance away from the first conveyor 12. On the other hand, if only seven out of ten deflecting segments shown in FIG. 5 are employed, for example, the velocity component imparted to the article will deflect or propel it to a second conveyor 14 less remote from the first conveyor.

This arrangement enhances the versatility of the deflecting apparatus according to the present invention. In bottle filling systems, so-called buffer or temporary storage paths are interposed between the individual stations, e.g., the filling station and the labelling station, or between the labelling station and the packaging station, where the bottles are conveyed along a plurality of parallel conveyors and may accumulate when the operating speeds of the individual stations differ, or when one station discontinues operation for a short period of time. The plurality of second conveyors 14 shown in FIGS. 5 and 6 form such a buffer path. The deflecting apparatus of the invention may be used to uniformly distribute bottles arriving on the relatively fast moving first conveyor 12 to a plurality of slow second conveyors 14. In FIG. 4, four second conveyors 14 are shown. A bottle is deflected to one of these second conveyors depending on whether four, six, eight or ten deflecting segments, for example, are employed to deflect it. If the operating speed of the system from which the first conveyor 12 receives the bottles slows down, the amount by which the bottles are deflected by the deflecting apparatus shown in FIG. 5 diminishes, causing the bottles to be distributed, for example, only to the second conveyors directly adjacent the first conveyor 12. As soon as the congestion of bottles has been dissipated and the two stations connected by the first conveyor 12 operate at the same speed, the deflecting apparatus 11 shown in FIG. 5 discontinues operation and the bottles remain on the first conveyor 12.

In the embodiment shown in FIG. 6 the bottles leave the first conveyor 12 in any event. The deflecting face 30 already extends from the fixed railing 16 and is continued by an oblique deflecting apparatus 11. This results in especially short deflecting paths and thus in a high operating speed.

A special advantage of the buffer paths shown in FIGS. 5 and 6 resides in the fact that the bottles do not aggregate and contact each other, thereby obviating the considerable noise common on such buffer paths.

A multiplicity of further embodiments will become apparent to the expert. Thus, for instance, if the bottles are spaced apart a constant distance on a rapidly advancing conveyor, the individual deflecting segments can be extended and retracted by a cam shaft operating in synchronism with the conveyor, rather than by pneumatic cylinders. The embodiments shown in FIGS. 5 and 6 can, of course, also operate with air nozzles as deflecting means, in which case the bottles can be simultaneously slowed down by suitable alignment of the air nozzles to thereby adapt their speed to the lesser speed of the second conveyor. Moreover, it is possible to alternatingly use deflecting wedges of different length and inclination in order to deflect the bottles to different ones of the second conveyors.

What is claimed is:

1. Means for laterally deflecting articles selected according to a specific criterion from a first path of travel to a second path of travel of the deflected articles, said means comprising
    (a) a plurality of deflecting members stationary in the direction of travel of the articles to be deflected, each of said deflecting members cumulatively deflecting the articles to be deflected by only a portion of the total deflection;
    (b) said deflecting members being so arranged with respect to the direction of travel along said first path of travel (12) that the velocity component of an article (10) to be deflected transversely of the direction of conveyance is increased, but that the article, after having left the last deflective member ($18n$; $70n$), is deflected less than the total deflection, and (c) said deflecting members being so arranged that an article (10) to be deflected, after having left the last said deflecting means, has a velocity component transversely of the conveying direction such that it continues moving to said second path of travel (14) by inertia.

2. Means according to claim 1, wherein said means comprises both deflecting members and gas nozzles, the first deflecting means comprising deflecting members, followed by said gas nozzles.

3. Means according to any one of claims 1, 2 and wherein a plurality of second conveyors (14) are provided, the number of deflecting means and/or the extent of their extension or intensity being so controlled that different velocity components transversely of the direction of conveyance are imparted to the articles, whereby to deflect them to different ones of said second conveyors (14).

4. Means for laterally deflecting articles selected according to a specific criterion from a first path of travel to a second path of travel of the deflected articles, said means comprising
(a) a plurality of members stationary in the direction of travel of the articles to be deflected, while being extensible and retractable in a direction substantially transverse thereto, each of said deflecting members cumulatively deflecting the articles to be deflected by only portion of the total deflection;
(b) the operative face (21) of each deflecting member ($18a$, ...) being arranged at an angle with respect to the direction of travel along said first path of travel (12), such that the velocity component of an article (10) to be deflected transversely of the direction of conveyance is increased, the last deflecting member ($18n$) being extensible less than the amount of total deflection; and
(c) the number of deflecting members and the angle of said operative faces (21) being such that an article (10) to be deflected, after having left the last deflecting member, has a velocity component transversely of the conveying direction such that it continues moving to said second path of travel by inertia.

5. Means for laterally deflecting articles selected according to a specific criterion from a first path of travel to a second path of travel of the deflected articles, said means comprising
(a) a plurality of gas nozzles, each of said nozzles cumulatively deflecting the articles to be deflected by only a portion of the total deflection;
(b) the intensity of said gas nozzles ($70n$) being graduated, such that the velocity component of an article (10) to be deflected transversely of the direction of conveyance is increased, the article, after having left the final gas nozzle ($70n$), being deflected less than the total deflection, and
(c) the intensity of said gas nozzles ($70n$), respectively, being such that an article (10) to be deflected, after having left the last deflecting means, has a velocity component transversely of the conveying direction such that it continues moving to said second path of travel (14) by inertia.

* * * * *